United States Patent [19]

Johnson et al.

[11] Patent Number: 5,917,116
[45] Date of Patent: Jun. 29, 1999

[54] METHOD FOR THE PROCESSING OF COPPER MINERALS

[75] Inventors: Gary Donald Johnson, Nedlands; Naralia Streltsova, Wembley Downs, both of Australia

[73] Assignee: Dominion Mining Limited, West Perth, Australia

[21] Appl. No.: 08/695,787

[22] Filed: Aug. 12, 1996

[30] Foreign Application Priority Data

Aug. 14, 1995 [AU] Australia ............................... PN 4766

[51] Int. Cl.⁶ ................................................. C22B 15/00
[52] U.S. Cl. ................................ 75/710; 75/711; 75/712; 75/739; 75/740; 75/743; 75/728
[58] Field of Search ............................. 75/710, 711, 712, 75/739, 740, 743, 728

[56] References Cited

U.S. PATENT DOCUMENTS

| | | | |
|---|---|---|---|
| 2,996,440 | 8/1961 | Forward et al. | 204/119 |
| 3,637,371 | 1/1972 | Mackiw et al. | 75/101 |
| 3,777,005 | 12/1973 | Gerlach et al. | 423/27 |
| 3,896,208 | 7/1975 | Dubeck et al. | 423/27 |
| 3,949,051 | 4/1976 | Pawlek | 423/20 |
| 4,266,972 | 5/1981 | Redondo-Abad et al. | 75/101 |
| 4,405,569 | 9/1983 | Dienstbach | 423/27 |
| 4,552,589 | 11/1985 | Mason et al. | 75/105 |
| 5,232,491 | 8/1993 | Corrans et al. | 75/743 |

FOREIGN PATENT DOCUMENTS

| | | | |
|---|---|---|---|
| B 18890/76 | 12/1978 | Australia | C22B 3/00 |
| B 17181/83 | 8/1985 | Australia | C22B 15/08 |
| B-13369/88 | 9/1988 | Australia | B02C 17/16 |

OTHER PUBLICATIONS

Amer, A.M., *Investigation of the direct hydrometallurgical processing of mechanically activated complex sulphide ore, Akarem area, Egypt*, 1994.

Balaz et al., P., *Mechanical preservation of complex sulphide ores as a means of enhancing their leaching*, 1989, pp. 750–769.

Balaz et al., P., *Oxidative leaching of mechanically activated sphalerite*, 1991, p. 141–150.

Beckstead et al., L. W., Acid Ferric Sulfate Leaching of Attritor–Ground Chalcopyrite Concentrates, International Symposium on Copper Extraction & Refining, 1976, pp. 611–637.

Berezowsky et al., R.M.G.S, Pressure Oxidation Pretreatment of Refractory Gold, Minerals and Metallurgical Processing, May 1984, pp. 1–4.

Biangardi et al., S., The Treatment of Sulphidic Copper Ores by the LM(Lurgi–Mitterberg) Process, International Symposium on Hydrometallurgy, 1973, pp. 5.1–5.4.

Cheng, C., *The Leaching of Copper Sulphides in Acidic Oxygenated Sulphate–Chloride Solutions*, Department of Chemical Engineering, Monash University, Australia, Jul. 1990, pp. iii–vi, 126, 128–131, pp. 170–172.

Corrans, I.J., Ultra Fine Milling for the Recovery of Refractory Gold, Minerals Engineering, vol. 4, Nos. 7–11, 1991, pp. 763–776.

Gerlach et al., J. K., Activation and Leaching of Chalocopyrite Concentrates with Dilute Sulfuric Acid, International Symposium on Hydrometallurgy, 1973, pp. 401–416.

Habashi, F., Extractive Metallurgy, Hydrometallurgy, vol. 2, 1970, pp. 99–131.

Juhasz, A. Z., *Mechanical Activation of Minerals by Grinding: Pulverizing and Morphology of Particles*, 1990, pp. 12–16, 222.

Kanome et al., O., Sulfuric Acid Oxygen–Pressure Leaching of $Ni_3S_2$ Prepared by a Wet Process, Hydrometallurgy, 1987, pp. 1–9.

Kulebakin et al., V. G., *Mechanism of Autoclave–Oxidative Leaching of Activated Pentlandite*, 1984, pp. 330–334.

Kulebakin et al., V. G., *Autoclave Leaching of Activated Pyrrhotite Concentrate*, Jun. 1981, pp. 566–569.

Kulebakin et al., V. G., *Case Transformations of Mechanically Activated Bornite in Autoclave Oxidative Leaching*, 1986, pp. 187–191.

Mulak et al., W., Recent Developments in Activation of Leaching of Metal Sulphides, 1993, pp. 189–194.

Neustroev et al., V. I., *Autoclave Leaching of Mechanically Activated Chalocopyrite Concentrate*, 1982, pp. 180–185.

Pawlek, F., Research in Pressure Leaching, Journal of the South African Institute of Mining and Metallurgy, Jul. 1969, pp. 632–655.

Pawlek, F., The Influence on Grain Size and Mineralogical Composition on the Leachability of Copper Concentrates, International Symposium on Copper Extraction & Refining, 1976, pp. 690–705.

Peters, E., Direct Leaching of Sulfides: Chemistry and Applications, Metallurgical Transactions, vol. 78, 1976, pp. 505–517.

Pietsch, H., *Copper sulphide ore dressing by the Lurgi–Mitterberg (LM) process,* Lurgi Chemie und Huttentechnik GmbH, 1977, pp. 1–7.

Ritcey, G. M., Recovery of Copper from Concentrated Solution By Solvent Extraction Using Kelex 100, Hydrometallurgy, Apr. 1973, pp. 75–83.

Ritcey, G., *Solvent Extraction*, 1979, pp. 196–248.

Sohn et al., H., *Rate Processes of Extractive Metallurgy*, 1979, pp. ix–xii, 148–153.

(List continued on next page.)

*Primary Examiner*—Patrick Ryan
*Assistant Examiner*—M. Alexandra Elve
*Attorney, Agent, or Firm*—Merchant, Gould, Smith, Edell, Welter & Schmidt, P.A.

[57] ABSTRACT

A method of processing a copper mineral, the method comprising activating the copper mineral by milling the copper mineral to P80 of between 2 and 20 micron, and subsequently subjecting the activated copper mineral to an oxidative hydrometallurgical treatment in the presence of chloride ions in an amount of from 2 to 10 g/L.

17 Claims, No Drawings

OTHER PUBLICATIONS

Tkacova et al., K., *Selective leaching of zinc from mechanically activated complex Cu–Pb–Zn concentrate*, 1992.

Tkacova et al., K., *Structural and Temperature Sensitivity of Leaching of Chalcopyrite with Iron(III) Sulphate*, 1988, pp. 103–112.

Turke et al., W., *Hydrometallurgical treatment of complex copper sulphide concentrates with special reference to the Lurgi–Mitterberg process*, Institute of Mining and Metallurgy, 1978, pp. 101–112.

Vezina, J.A., Further Studies on Acid Pressure Leaching a Chalcopyrite–Pentlandite–Pyrrhotite Concentrate, The Canadian Mining and Metallurgical Bulletin, May 1973, pp. 1–4.

Vizsolyi et al., A., Copper and sulphur from chalcopyrite by pressure leaching, Journal of Metals, Nov. 1967, pp. 52–59.

Weir et al., D.R., *Preconcentration and pressure oxidation of Porgera refractory gold ore*, 1986, pp. 201–207.

METHOD FOR THE PROCESSING OF COPPER MINERALS

FIELD OF THE INVENTION

This invention relates to a method for the processing of copper minerals. In particular, the invention relates to a method for the activation of copper minerals prior to the processing of those minerals by methods of oxidative hydrometallurgy.

It is to be understood that where the term 'copper minerals' is used throughout this specification, the term is to include within its scope copper minerals per se, such as chalcopyrite, and also intermediate copper-bearing products, such as mattes and concentrates, derived from ores containing copper minerals. Other typical copper minerals such as chalcocite and bornite, or any other like copper mineral species may also be subjected to the method of this invention, and thus may also fall within the scope of the term 'copper minerals'.

BACKGROUND OF THE INVENTION

Known processing methods of oxidative hydrometallurgy are commonly used in many different applications. These applications generally require oxidation conditions of high temperature and pressure, and require substantial supplies of oxygen. For example, base metals such as copper, nickel and zinc can be recovered by hydrometallurgical processes which usually embody pretreatment, oxidative leaching, solid/liquid separation, solution purification, metal precipitation or solvent extraction and electrowinning.

According to conventional technology, oxidative processes usually require severe physico-chemical conditions in order to achieve acceptable rates of oxidation and/or final recoveries of metal. Under these severe physico-chemical conditions, which often mean temperatures in excess of 200° C. and total pressures in excess of 2000 kPa, the chemical reactions which occur use large quantities of oxygen, both on stoichiometric considerations and in practice where amounts in excess of stoichiometric requirements are often used.

The typical oxidative hydrometallurgical processing methods referred to above generally have oxidation reactions that are carried out in multicompartment autoclaves fitted with agitators. In order to withstand the generally highly aggressive conditions of the reactions, the autoclaves are very costly to install and maintain. These vessels must be capable of withstanding high pressure, and linings of heat and acid resistant bricks often need to be used. The agitators are generally made of titanium metal or other, more costly alloys, and the pressure relief systems utilised are also costly and require high maintenance. These high costs, together with the sophistication of the technology (skilled operators are generally required), detract from the wider acceptance of high pressure/high temperature oxidation, particularly for use in remote areas or by small to medium size operators.

U.S. Pat. No. 5,232,491 (assigned to Dominion Mining Limited) describes a method of activating a mineral species in order to alleviate the difficulties and expenses referred to above with the traditional processing methods of oxidative hydrometallurgy, and in particular with the oxidative leaching of a mineral species. In the method of U.S. Pat. No. 5,232,491 the mineral species is activated by fine or ultra fine milling prior to processing by methods of oxidative hydrometallurgy. The milled mineral species may be subjected to oxidative leaching under relatively mild conditions of pressure and temperature due to the milling producing minerals which are activated, and which thus react far more readily with oxidants such as oxygen. Furthermore, the oxidative leaching is able to be conducted under conditions using less oxidant than that required for complete sulphur oxidation to sulphate.

While the method as described in U.S. Pat. No. 4,232,491 is applicable to any mineral species, such as sulphide minerals, arsenide minerals, telluride minerals, or mixed minerals of sulphides, arsenides or tellurides, the method is particularly useful for the activation and subsequent leaching of sulphide minerals.

However, copper sulphide minerals, and in particular chalcopyrite, have been difficult to treat by oxidative hydrometallurgy in sulphate systems. Indeed, even the method described by U.S. Pat. No. 5,232,491 has had limited success when applied to copper sulphide concentrates containing chalcopyrite.

In this respect, when practising the method of U.S. Pat. No. 5,232,491 on chalcopyrite it has been found that the dissolution of the chalcopyrite is often incomplete. Although the precise reason for this has not been determined with certainty, it is believed that very fine coatings build up on the surface of the chalcopyrite (during leaching), thus preventing the relevant reactions going to completion. This results in long reaction times and usually low recoveries.

Thus, processing options for the treatment of chalcopyrite-containing concentrates have remained somewhat limited. Such options include the normal pyrometallurgical option, namely smelting, followed by a hydrometallurgical refining process, or alternatively the solely hydrometallurgical route which requires leaching with a highly concentrated chloride-based aqueous media. This latter type of system has not proven to be economically successful due to problems with the materials of construction (caused by the highly corrosive aqueous media), and their inability to recover a commercial product which does not require further refining prior to its final downstream processing.

Indeed, such chloride-based leaches rely on high concentrations of chloride ions, usually greater than 1M (or 35 g/L), and more typically 5 to 10M (or 175 to 350 g/L). The copper dissolved in such chloride-based leaches is therefore present as the chloride.

U.S. Pat. No. 4,971,662 is an example of a combined conventional grind and chloride-based leach system where chloride ion concentration is less than 75 g/L, and conditions are maintained so as to extract cupric copper in a dominantly chloride environment which can then be transferred to a sulphate solution using conventional solvent extraction techniques.

OBJECT OF THE INVENTION

It is an aim of the present invention to avoid of partly alleviate the difficulties referred to above in relation to the traditional processing methods of copper minerals, and in particular copper sulphide minerals such as chalcopyrite.

SUMMARY OF THE INVENTION

The present invention provides a method of processing copper that includes milling the copper mineral in a vertical stirred mill to P80 of between 2 and 20 microns to produce an activated copper mineral. The activated copper mineral is oxidatively leached in oxygen at a temperature of less than about 100° C. and at a pressure of less than about 1000 kPa for a time of less than about 75 minutes so as to produce elemental sulfur is the predominant sulfur product formed in the presence of chloride ions in an amount of from 2 to 10 g/L.

To prevent the passivation of the surface of the copper mineral in the essentially aqueous sulphate media used (and thus avoid the envisaged coating problems referred to above, particularly in relation to chalcopyrite), the small amount of chloride ion is added described above. The levels used are such that the system remains essentially a sulphate system, and the chloride ion is preferably provided by the addition of sodium chloride or hydrochloric acid, or another suitable chloride source, during the subsequent oxidative hydrometallurgical treatment.

in comparison to the known chloride-based leaches referred to above which rely on high concentrations of chloride ions, usually greater than 1M (or 35 g/L), and more typically 5 to 10M (or 175 to 350 g/L), where the copper is therefore present as the chloride, in the present invention the copper is dissolved essentially as sulphate, with the chloride ions acting as a form of catalyst to the dissolution reaction.

DESCRIPTION OF THE INVENTION

The activation of the copper mineral is preferably performed by fine or ultra fine milling according to the method described in U.S. Pat. No. 5,232,491. The milling is preferably carried out in a vertical stirred mill consisting of a tank filled with small grinding media, usually steel balls of 4 to 6 mm in diameter or the like, and agitated by means of a vertical shaft fitted with horizontal arms. The copper minerals is milled by the shearing action produced by ball-to-ball contact to produce an activated copper mineral.

In the present invention, this activation was measured by the response of the activated copper mineral to a subsequent oxidative hydrometallurgical treatment, such as an oxidative leach. The level of activation was found to be satisfactory when ground to a P80 of less than about 20 microns. However, size reduction to a P80 of between about 2 and 10 microns is desired, although a P80 of between about 4 and 10 microns is more highly preferred.

In relation to the degree of the size reduction, there has been research conducted in relation to the ultra fine milling of some copper minerals to sizes as small as 0.1 to 1.0 microns. However, such research encountered severe practical difficulties in achieving such a reduction in size and in controlling the sizes in the required manner, those difficulties causing the research to be commercially and economically unattractive. Indeed, at such small sizes the particles became extremely viscous, introducing handling difficulties, and requiring modification of the surface characteristics of the ground minerals to improve the handling properties thereof. For instance, this required the use of sodium hydroxide to remove the viscosity problem.

The present invention seeks to avoid those difficulties by constraining the grind size within upper and lower limits, and, by the use of the small amounts of chloride ions mentioned earlier, the size reduction may be conducted within more practical levels than those very fine and commercially impractical and uneconomic levels referred to above.

Vertical stirred mills have been found to be satisfactory to provide the preferred degree of fineness in the activated copper mineral, and to satisfy the energy and grinding media consumption requirements. However, the activation of the copper mineral has been found to be satisfactory when ground by other means such as a ball mill. In this respect, although the reason for the activation of the copper mineral is not yet fully understood, it is believed that it is a result of a number of factors, such as an increase in the surface area, a reduction in linear dimensions, the straining of crystal lattices, the exposure of regions of high activity in the lattice, and possibly the enhancement of the so-called 'galvanic effects'.

Preferably, the oxidative hydrometallurgical treatment which follows the activation of the copper mineral is an oxidative leach conducted in an aqueous slurry with oxygen as the oxidant. Further, the oxidative leach is preferably conducted at relatively mild temperature and pressure with low levels of oxidant. Preferred operating conditions have been found to be around 60 to 100° C. with oxygen pressures of around 900 to 1000 kPa and with oxygen as oxidant. The reactor used is commonly referred to as an autoclave and generally is equipped with a string mechanism which keeps the fine slurry in suspension and disperses the oxygen gas within the slurry. These preferred operating conditions allow for the use of a relatively low cost reactor which can be made of polypropylene or other suitable engineering plastics. The mild operating conditions avoid the need for the use of titanium reactors or other expensive systems.

In a further preferred form of the invention, the pH should be maintained at pH less than about 2.5 to prevent the precipitation of copper. This may be achieved by the addition of an acid such as sulphuric acid, which may be added as fresh sulphuric acid or as recycled sulphuric acid generated in downstream processing stages. This sulphuric acid may be added either during or before the oxidative leach (or indeed before the milling of the copper mineral), although in a batch operation it would be preferred to add it prior to the milling, rather than during the oxidative leach. Further still, the solids concentration is preferably diluted to around 10% to keep copper recoveries high.

A residence time of less than about 45 minutes is preferred as this results in high levels of copper dissolution and in the presence of elemental sulphur in the residue. The amount of oxygen used is therefore less than that required for complete oxidation of sulphide sulphur to sulphate. With longer residence times, continued oxidation of the elemental sulphur occurs with no notable improvement in copper dissolution.

It is well known that copper minerals, and in particular chalcopyrite, are extremely difficult to treat by hydrometallurgical processes in aqueous sulphate systems, and in the present invention it is clear that, in the absence of chloride ions, the dissolution of chalcopyrite is often not complete. However, the presence of the chloride ion, regardless of the actual mechanism that it utilises to do so, removes that problem. Thus, the present invention describes how copper may be obtained from a copper mineral, in particular a copper sulphide mineral such as chalcopyrite, with good recoveries and under mild conditions.

Importantly, the solution produced by the preferred oxidative leaching process of the invention, being essentially sulphate in nature after separation from the solid residue, is suitable for subsequent treatment by well established methods of solvent extraction and electrowinning to produce high value copper metal products. Commercially available downstream processing methods can thus be used to recover the copper as a premium quality product, which is an advantage of the method of the present invention over various of the earlier methods referred to above.

Before turning to the detailed description of the invention, it will be understood that many of the operating conditions and ranges specified above are somewhat ore specific. Thus, it should be appreciated that slight variations from those conditions and ranges, as a result of differring ore types, are still envisaged to be within the scope of the present invention.

DETAILED DESCRIPTION OF THE INVENTION

The present invention will now be described in relation to the following Examples. However, it will be appreciated that the generality of the invention as described above is not to be limited by the following description.

EXAMPLE 1

A copper concentrate (24.6% Cu and 32% S) produced by flotation from Queensland copper ore was subjected to fine grinding to a P80 size of 6.5 micron by grinding in a vertical stirred mill. After milling, acid was added to the slurry along with a small amount of sodium chloride, and the mixture was diluted with water. The slurry was then placed in an autoclave, the temperature of which was maintained at 100° C. Oxygen at 1000 kPa was introduced into the autoclave and the reactions were allowed to proceed for 75 minutes.

In each of the three examples here described, the residence time is given as 75 minutes. However, it should be appreciated that samples were taken at each of 45 and 50 minutes, and those samples revealed that the copper recovery at those times was essentially the same as the recovery at 75 minutes.

| concentrate | 200 g |
|---|---|
| NaCl | 12 g |
| $H_2SO_4$ | 120 g |
| $H_2O$ | 2000 g |

After oxidation, a copper solution of 20 g/L copper had been generated with an overall copper recovery of 98%. The 12 g of NaCl here represents about 6 g/L of NaCl, and thus about 4 g/L of chloride ions.

EXAMPLE 2

A copper concentrate (27.8% Cu and 34% S and 2.2% Pb) was subjected to the method as per Example 1:

| concentrate | 190 g |
|---|---|
| NaCl | 12 g |
| $H_2SO_4$ | 120 g |
| $H_2O$ | 2000 g |

After activation of the concentrate by grinding to a P80 size of 4.7 micron, the above mixture was processed at 100° C. for 75 minutes with an oxygen pressure of 1000 kPa, giving rise to a copper solution of 21.8 g/L at an overall copper recovery of 96%.

EXAMPLE 3

A copper concentrate, predominantly chalcopyrite (36.7% Cu and 35% S) was subjected to the method as per Example 1:

| concentrate | 250 g |
|---|---|
| NaCl | 10 g |
| $H_2SO_4$ | 100 g |
| $H_2O$ | 1800 g |

After activation of the concentrate by grinding to a P80 size of 5.0 micron, the above mixture was processed at 100° C. for 75 minutes with an oxygen pressure of 1000 kPa, giving rise to a copper solution of 31.5 g/L at an overall copper recovery of 95%.

Finally, it will be appreciated that there may be other variations and modifications to the methods described above that also fall within the scope of the present invention.

We claim:

1. A method of processing a copper mineral, the method comprising;

milling the copper mineral in a vertical stirred mill to P80 of between 2 and 20 micron to produce an activated copper mineral; and oxidatively leaching the activated copper mineral in oxygen at a temperature less than about 100° C. and at an oxygen pressure less than about 1000 kPa for a time less than about 75 minutes, such that elemental sulphur is a predominant sulphur product formed in the presence of chloride ions in an amount of from 2 to 10 g/L.

2. A method according to claim 1 wherein the chloride ions are present in an amount of from 3 to 5 g/L.

3. A method according to claim 1 wherein the copper mineral is a copper sulphide mineral.

4. A method according to claim 1 wherein the copper mineral is chalcopyrite.

5. A method according to claim 1 wherein the copper mineral is milled to P80 of between 2 and 10 micron.

6. A method according to claim 5 wherein the copper mineral is milled to P80 of between 4 and 10 micron.

7. A method according to claim 1 wherein the chloride ions are provided in the form of sodium chloride or hydrochloric acid added during the oxidative hydrometallurgical treatment.

8. A method according to claim 2 wherein the copper mineral is a copper sulphide mineral.

9. A method according to claim 8 wherein the copper mineral is chalcopyrite.

10. A method according to claim 9 wherein the copper mineral is milled to P80 of between 2 and 10 micron.

11. A method according to claim 10 wherein the oxidative hydrometallurgical treatment is an oxidative leach conducted in aqueous slurry with oxygen as the oxidant.

12. A method according to claim 11 wherein the chloride ions are provided in the form of sodium chloride or hydrochloric added during the oxidative hydrometallurgical treatment.

13. A method according to claim 12 wherein the oxidative hydrometallurgical treatment is an oxidative leach conducted with a residence time such that the amount of oxidant used is less than that required for complete oxidation of sulphide sulphur to sulphate.

14. A method according to claim 3 wherein the copper mineral is chalcopyrite.

15. A method according to claim 3 wherein the copper mineral is milled to P80 of between 2 and 10 micron.

16. A method according to claim 4 wherein the copper mineral is milled to P80 of between 2 and 10 micron.

17. A method according to claim 6 wherein the oxidative hydrometallurgical treatment is an oxidative leach conducted in aqueous slurry with oxygen as the oxidant.

* * * * *